May 9, 1939.  H. ALFARO  2,157,586
WOBBLER ACTUATING PISTON FOR BARREL ENGINES
Original Filed Oct. 16, 1935  2 Sheets-Sheet 1
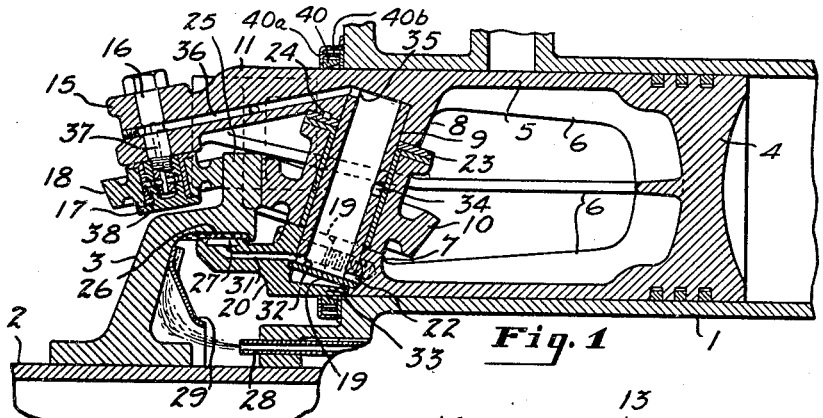
Fig. 1
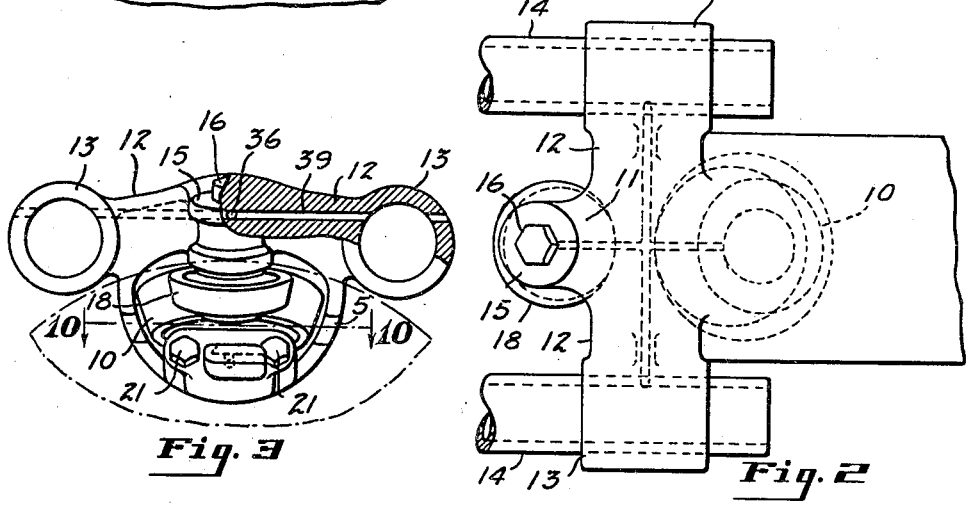
Fig. 3
Fig. 2
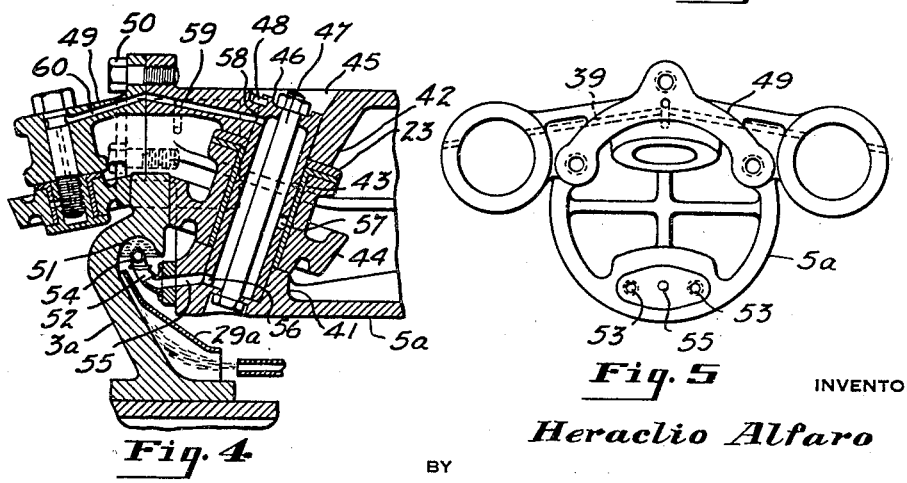
Fig. 4
Fig. 5
INVENTOR
*Heraclio Alfaro*
BY
*Evans & McCoy*
ATTORNEYS May 9, 1939.  H. ALFARO  2,157,586

WOBBLER ACTUATING PISTON FOR BARREL ENGINES

Original Filed Oct. 16, 1935  2 Sheets-Sheet 2

INVENTOR
*Heraclio Alfaro*
BY
*Evans & McCoy*
ATTORNEYS

Patented May 9, 1939

2,157,586

UNITED STATES PATENT OFFICE 2,157,586

WOBBLER ACTUATING PISTON FOR BARREL ENGINES

Heraclio Alfaro, Boston, Mass.

Original application October 16, 1935, Serial No. 45,290. Divided and this application July 30, 1937, Serial No. 156,429

1 Claim. (Cl. 74—60)

The present invention relates to engines of the wobbler cam or barrel type, particularly engines of the two-stroke cycle type having two pistons per cylinder, the improvements being in the cam actuating pistons of such engines and parts associated with the pistons.

This application is a division of my application Serial No. 45,290, filed October 16, 1935.

The present invention has for an object to provide a piston which has effective means for applying thrust to the wobbler cam and for receiving the thrust of the cam.

A further object is to provide a piston provided with means for rigidly supporting cam engaging thrust rollers and so constucted as to readily permit mounting or removal of the rollers.

With the above and other objects in view the invention may be said to comprise the piston as illustrated in the accompanying drawings hereinafter described and particularly set forth in the appended claim together with such variations and modifications thereof as will be apparent to one skilled in the art to which the invention appertains.

Reference should be had to the accompanying drawings forming a part of this specification, in which:

Figure 1 is a longitudinal section through one of the pistons showing portions of the associated cylinder, wobbler cam and engine shaft;

Fig. 2 is a top plan view of the outer end of the piston shown in Fig. 1;

Fig. 3 is an end elevation looking at the outer end of the piston;

Fig. 4 is a sectional view showing a piston of slightly modified construction;

Fig. 5 is an end elevation of the piston shown in Fig. 4;

Figure 6:
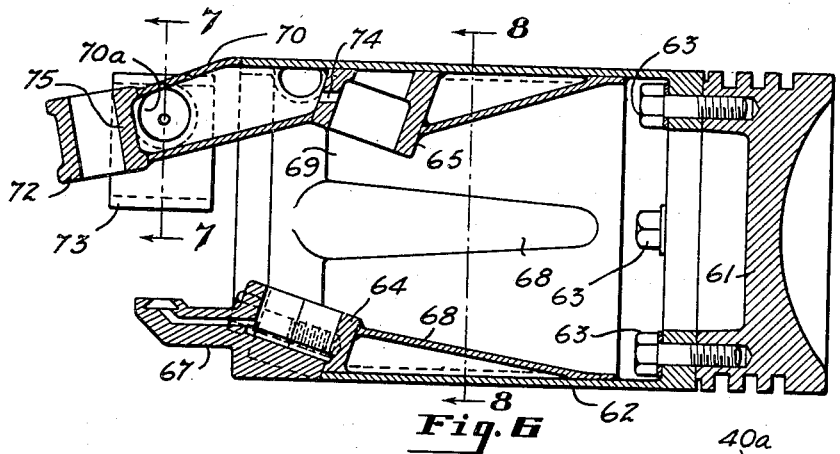
Fig. 6 is a sectional view showing a piston embodying the invention in which the skirt is of composite sheet metal construction.
Figure 7:
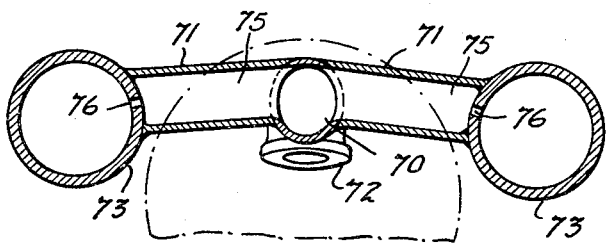
Fig. 7 is a section taken on the line indicated at 7—7 in Fig. 6.
Figure 9:
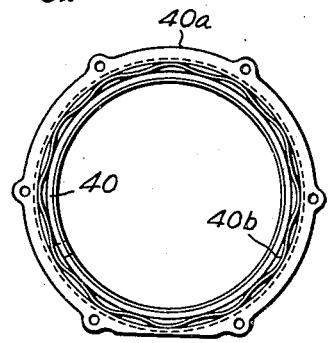
Fig. 9 shows the oil scaping ring in elevation.
Figure 8:
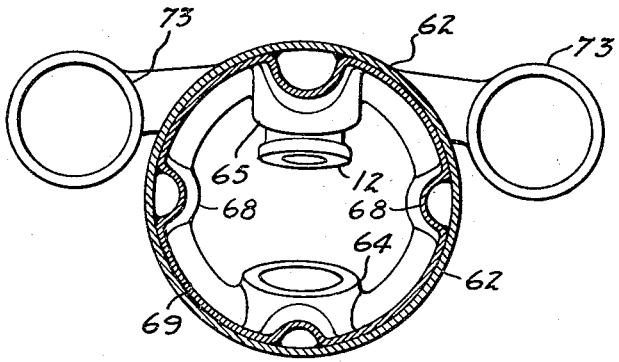
Fig. 8 is a section taken on the line indicated at 8—8 in Fig. 6.
Figure 10:
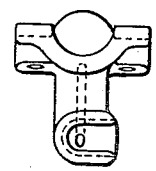
Fig. 10 is a plan view of the oil scoop bracket viewed as indicated at 10—10 in Fig. 3.

In the accompanying drawings there is shown one of the cylinders 1 of a barrel engine which is disposed parallel to the cental engine shaft 2 to which is attached a wobbler cam 3 through which the linear movements of the pistons impart rotary motion to the shaft. One of the pistons 4 is shown, it being understood that all of the pistons of the engine are alike.

The piston 4 has a tubular skirt 5 which may be formed integrally with the head of the piston. The skirt 5 is preferably stiffened by regularly spaced longitudinally extending internal ribs 6. Two diametrically opposite ribs 6 terminate at their outer ends in bearing bosses 7 and 8, one on the side of the skirt adjacent the shaft 2 and the other in the outer side of the skirt. A bore is cut through the skirt 5 and boss 7 at an oblique angle to the piston axis and an alined bore is cut into the inner boss 8 to a depth sufficient to form a socket for a tubular shaft 9 which seats at its opposite ends in the bosses 7 and 8. The shaft 9 provides a bearing for a beveled thrust roller 10 which rolls upon the inner face of the cam 3.

The outer portion of the skirt 5 has an integral extension 11 which at its outer end has integral laterally extending arms 12 terminating in bearings 13 adapted to slide on fixed guide rods 14, the arms 12 providing a cross head on the piston between the guide rods. At its outer end between the inner ends of the arms 12, the extension 11 has a thickened central portion 15 provided with an oblique opening to receive a bolt 16 which secures in place a short shaft 17 which provides a supporting bearing for a beveled follower roller 18 which rolls upon the rear face of the wobbler cam 3 and serves to prevent excessive axial play between the piston and cam.

The outer end of the inner side of the skirt 5 is separated from the body of the skirt in a plane across the center of the boss 7 as indicated at 19 in Fig. 1 to form a detachable member 20 which is secured to the body of the skirt by bolts 21 screwed into apertures in the halves of the boss 7.

To mount the bevel roller 10 within the skirt 5 the detachable member 20 is removed, the roller 10 is slipped into place between the bosses 7 and 8 and the shaft 9 is inserted through the roller into the socket in the boss 8 after which the portion 20 is bolted in place. The shaft 9 is held against turning movements by a dowel 22. A thrust washer 23 interposed between the roller 10 and the boss 8 and a dowel 24 holds the thrust washer against turning movements.

The cam 3 has the peripheral roller engaging portion 25 thereof offset inwardly with respect to the body of the cam to provide an annular end portion which is adapted to enter the slots in the outer ends of the pistons. The offset portion provides an internal substantially cylindrical shoulder 26 which closely overlies an oil collecting scoop 27 formed at the end of the detachable member 20 of the skirt. A nozzle 28 discharges oil against the inner face of the cam and this oil is thrown out by centrifugal force along the face of the cam, maintaining a film of oil on the internal shoulder 26. An annular baffle plate 29 may be attached to the cam to prevent any oil being thrown away from the face of the cam. The baffle plate 29 flares inwardly from the face of the cam and has an outer marginal portion which is positioned close to the face of the cam so that any oil moving outwardly either on the surface of the cam or the inner face of the baffle plate is directed in a thin film outwardly to the internal shoulder 26.

A passage 31 is formed in the detachable member 20 of the skirt and extends from the oil collecting scoop to the opening in the boss 7 registering with an aperture 32 in the shaft 9 to deliver oil to the interior of the shaft. The opening through the boss 7 is closed by the inner end portion 33 of the detachable member 20 to prevent leakage of oil and the hollow shaft 9 has an opening 34 midway between its ends on the side opposite that against which the thrust of the roller is exerted. The opening 34 delivers oil to the bearing of the roller 10 on the side where there is the least pressure so that there is an ample supply of oil to the roller bearing. Near its outer end the shaft 9 has an opening 35 which permits flow of oil from the interior of the shaft 9 to a passage 36 extending through the extension 11 to the roller supporting portion 15. The bolt 16 is provided with an axial passage 37 which delivers oil from the passage 36 into the interior of the shaft 17 which has a lateral opening 38 to the roller bearing. Lateral passages 39 in the arms 12 deliver oil from the passage 36 to the cross head bearings 13.

During operation of the engine, oil is automatically delivered from the cam face to the bearings of the thrust and follower rollers and to the crosshead bearings.

In engines of the two-stroke cycle type having opposed pistons in each cylinder and ports opening through the cylinder wall, it is difficult to avoid leakage of oil into the ports and to the combustion chamber due to the scraping of oil off the piston skirt into the ports during movements of the piston past the ports.

At the open end of the cylinder 1 there is mounted an oil scraping ring 40 which engages the piston skirt 5 which sweeps the oil from the exterior surface of the skirt during the inward stroke of the piston, thereby saving oil which would otherwise be scraped off into ports in the cylinder wall and leak into the scape ahead of the piston and be consumed with the fuel.

The oil scraping ring 40 is a resilient split ring which may be constructed like an ordinary piston ring mounted in a retaining ring 40a detachably secured to the end of the cylinder and is backed by a spring 40b interposed between the exterior periphery of the ring 40 and the bottom of the channel formed between the ring 40a and the edge of the cylinder, the spring 40b serving to maintain a suitable pressure between the interior of the ring 40 and the surface of the piston skirt. The portion of the skirt 5 with which the scraper ring 40 engages preferably has a continuous smooth cylindrical surface without recesses in which oil can accumulate so that the skirt can be swept clean by the scraper ring. The exterior surface of the closure forming portion 33 of the member 20 is machined to conform to the exterior surface of the skirt so that there is no recess for accumulation of oil at the opening through which the roller shaft 9 is inserted.

In Figs. 4 and 5 of the drawings there is shown a slightly modified construction in which the piston skirt 5a is provided with internal bosses 41 and 42 at the inner and outer sides thereof to support a tubular obliquely disposed shaft 43 which provides a bearing for the thrust roller 44. In this instance the skirt is bored through the outer boss 42 providing an aperture 45 through which the shaft 43 may be inserted and a socket in the boss 41 to receive the inner end of the shaft 43. At its outer end the shaft 43 is closed by a head 46 and the shaft is secured in place by means of a bolt 47 which extends through the skirt wall at the inner end of the shaft and through the head 46. A dowel 48 is provided to hold the shaft 43 against rotation. A crosshead extension 49 is detachably secured to the body of the skirt outwardly of the boss 42 by means of bolts 50. The thrust roller 44 is inserted into the outer end of the skirt 5a before the extension 49 is attached and after the roller 44 is positioned between the bosses 41 and 42 the shaft 43 is inserted and secured in place.

The wobbler cam 3a has its marginal thrust roller engaging portion inwardly offset and within the shoulder of the cam there is provided an oil groove 51 into which oil is directed by the inner face of the cam and the baffle 29a.

An oil scoop in the form of a tubular member 52 is secured to the end of the skirt body outwardly of the boss 41 by bolts which are screwed in the apertures 53 shown in Fig. 5. The scoop has a laterally bent outer end portion 54 positioned in the oil groove 51 of the cam. A passage 55 in the skirt leads from the oil scoop to the socket in boss 41 and the shaft 43 has an aperture 56 registering with the passage 55. Midway between its ends the tubular shaft 43 has an opening 57 through which lubricant is supplied to the roller bearing. At its outer end the shaft 43 has an aperture 58 opening to a passage 59 in the skirt 5a which leads to a passage 60 in the cross head extension 49 from which oil is supplied to the bearing of the follower roller and to the cross head bearings.

In Fig. 6 of the drawings there is shown a piston having a head 61 which may be formed of an aluminum alloy or other suitable metal having high heat conductivity and a thin metal skirt 62 formed of sheet steel or steel tubing and secured to the head 61 by suitable means such as bolts 63. Supporting bosses 65 and 64 for opposite ends of a thrust roller supporting shaft may be secured by welding or brazing to the interior of the skirt 62, the skirt 62 being provided with an opening registering with the inner socket 64 to permit the roller supporting shaft to be inserted. In order to permit the thrust roller to be inserted into the skirt a scoop extension 67 is provided which is detachable, the inner end of the extension closing the open end of the socket 64 and being detachably secured to the socket by bolts as in the modification shown in Fig. 1. The skirt 62 is reenforced interiorly by longitudinal bracing elements 68 which are formed of sheet metal and V-shaped to form internal ribs when secured to the interior of the skirt 62 by welding or brazing. Two of the bracing elements 68 are in alinement with the bosses 64 and 65 and are welded or brazed to the bosses. The bracing members are preferably an integral part of a sleeve 69 which fits within the piston skirt. The skirt 62 and sleeve 69 are provided with integral portions extending outwardly of the boss 65 which are welded or brazed together to form a hollow extension 70 and hollow arms 71 extending laterally from the extension 70. A sleeve 72 for supporting the follower roller is welded or brazed to the outer end of the hollow extension 70 and bearing sleeves 73 are welded or brazed to the outer ends of the arms 71.

Lubrication of the roller and cross head bearings is substantially the same as described in detail in connection with Fig. 1.

An aperture 74 is provided in the boss 65 through which oil may flow from the interior of the roller supporting shaft into the hollow extension 70. An aperture 75 in the sleeve 72 permits flow of oil to the bearing of the follower roller. The hollow arms 71 communicate with the hollow extension 70 and apertures 76 are provided in the crosshead bearing sleeves 73 to lubricate the same.

It will be apparent that the present invention provides a piston having a rigidly attached crosshead and interiorly mounted cam engaging rollers which possesses the necessary rigidity and which can readily be assembled in operative relation to the cam and which can be readily disassembled to permit repair or replacement of parts.

It will further be apparent that simple and effective means are provided for automatically lubricating roller and crosshead bearings during operation of the engine, and for preventing excessive loss of oil through the cylinder ports or by leakage into the combustion chamber.

Furthermore, it is to be understood that the particular form of apparatus shown and described, and the particular procedure set forth, are presented for purposes of explanation and illustration and that various modifications of said apparatus and procedure can be made without departing from my invention as described in the appended claim.

What I claim is:

A piston for barrel engines having a skirt provided at the open end thereof with a crosshead extension at one side thereof which has spaced guide engaging bearings, a roller mounted upon the interior of the skirt, a second roller mounted on said extension intermediate said crosshead bearings, an extension on the side of the skirt diametrically opposite the crosshead extension, one of said extensions being detachably connected to the skirt to permit mounting of the roller upon the interior of the skirt.

HERACLIO ALFARO.